(12) United States Patent
Lahdensivu

(10) Patent No.: US 8,954,793 B2
(45) Date of Patent: Feb. 10, 2015

(54) METHOD AND A STORAGE SERVER FOR DATA REDUNDANCY

(75) Inventor: Kimmo Lahdensivu, Lempaala (FI)

(73) Assignee: Varaani Works Oy, Tampere (FI)

( * ) Notice: Subject to any disclaimer, the term of this patent is extended or adjusted under 35 U.S.C. 154(b) by 186 days.

(21) Appl. No.: 13/496,674

(22) PCT Filed: Sep. 15, 2010

(86) PCT No.: PCT/FI2010/050710
§ 371 (c)(1),
(2), (4) Date: Mar. 16, 2012

(87) PCT Pub. No.: WO2011/033174
PCT Pub. Date: Mar. 24, 2011

(65) Prior Publication Data
US 2012/0173925 A1  Jul. 5, 2012

(30) Foreign Application Priority Data
Sep. 16, 2009 (FI) ..................... 20095950

(51) Int. Cl.
*G06F 11/08* (2006.01)
*H04L 29/08* (2006.01)
*G06F 11/10* (2006.01)
*G06F 11/14* (2006.01)

(52) U.S. Cl.
CPC ........ *H04L 67/1095* (2013.01); *G06F 11/1008* (2013.01); *G06F 11/1453* (2013.01); *G06F 11/1464* (2013.01); *H04L 67/1097* (2013.01); *G06F 11/1456* (2013.01); *G06F 11/1469* (2013.01)

USPC .......... 714/6.24; 714/6.2; 714/6.22; 707/687; 707/697; 711/114

(58) Field of Classification Search
USPC ............... 714/6.2, 6.3, 6.31, 6.22, 6.23, 6.24, 714/6.32; 707/622, 636, 639, 646, 697, 707/698, 699, 687; 711/114
See application file for complete search history.

(56) References Cited

U.S. PATENT DOCUMENTS 6,883,110 B1 * 4/2005 Goddard ...................... 714/6.22
7,136,976 B2 * 11/2006 Saika ............................ 711/162

(Continued)

OTHER PUBLICATIONS iDIBS: An improved distributed backup system by Morcos From 12th International Conference on Parallel and Distributed Systems, 2006 http://www.cse.nd .edu/~dthain/papers/idibs-icpads06.pdf.*

*Primary Examiner* — Joseph Schell
(74) *Attorney, Agent, or Firm* — Ziegler IP Law Group, LLC.

(57) ABSTRACT

A method and a storage server for backing up data, involves mass storage devices of users of the service that connect to the storage server of the service provider over a public data network. The customers store the data with their terminals. The data is stored to the file system of the mass storage device which encrypts the stored data and transfers the data in encrypted form over the public data network to the storage server. The storage server calculates error correction data from the encrypted data. The error correction data is stored in the mass memory of the storage server. When recovering the stored data of the users, the storage server requests the stored data of all the users whose data was used for the error correction data calculation over the public data network to be used for the recovery calculation.

19 Claims, 1 Drawing Sheet

(56) References Cited

U.S. PATENT DOCUMENTS

| | | |
|---|---|---|
| 7,529,834 B1 * | 5/2009 | Birrell et al. .................. 709/226 |
| 7,761,678 B1 * | 7/2010 | Bodmer et al. ............... 711/165 |
| 7,991,951 B2 * | 8/2011 | Maroney et al. .............. 711/114 |
| 8,019,940 B2 * | 9/2011 | Flynn et al. ................... 711/114 |
| 2003/0131280 A1 * | 7/2003 | Gittins et al. ..................... 714/8 |
| 2004/0153615 A1 * | 8/2004 | Koning et al. ................ 711/162 |
| 2006/0031287 A1 * | 2/2006 | Ulrich et al. .................. 709/203 |
| 2010/0257219 A1 * | 10/2010 | Patel et al. .................... 707/827 |

\* cited by examiner

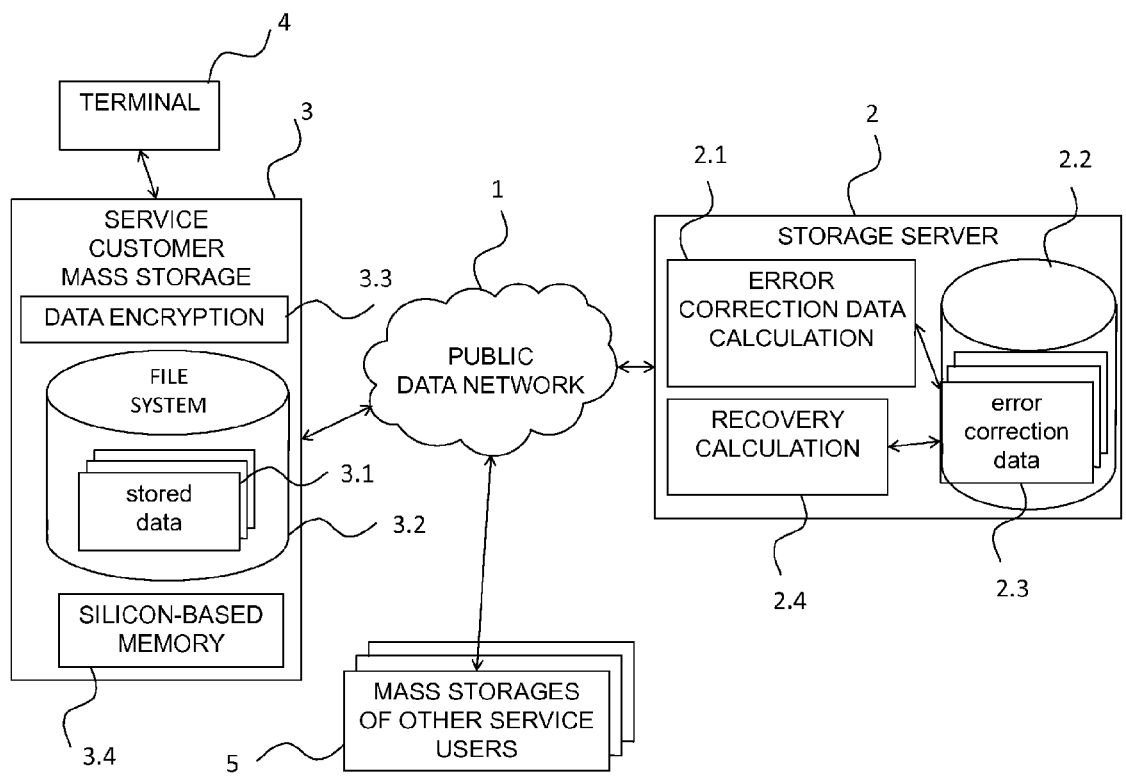

METHOD AND A STORAGE SERVER FOR DATA REDUNDANCY

BACKGROUND

1. Field

The aspects of the disclosed embodiments relate to a method for data redundancy.

2. Brief Description of Related Developments

In prior art methods for data redundancy over a data network the original stored data is copied, thus making the redundancy expensive as a redundancy service is required to have same amount of storage capacity as the combined capacity of the users of the service have. Examples of this type of services are Decho Mozy, Carbonite, Norton On-line Backup and F-Secure Online Backup. The services are marketed as unlimited, but the backup capacity is limited by constraining the backed up file types, by limiting the transfer speed or by limiting the data sources that can be backed up, so that the cost is kept as low as possible. The services targeted towards business users don't typically have these indirect limitations, but the users pay for the capacity they use for backup. The services available today are implemented as client applications that send the stored information to the data center of the service provider, where the information is stored to the mass storage of the service provider.

It would be advantageous to create new, more efficient system for data redundancy requiring only fraction of the storage capacity and storage resources the prior systems require.

SUMMARY

The method according to the aspects of the disclosed embodiments uses error correction algorithms for calculating error correction data from several separate stored data sets and storing the error correction data instead of the full copy of the stored data. Possible error correction algorithms to be used in this method are, for example, XOR (exclusive or) or Reed-Solomon-coding. The stored data can be recovered without the full copy, if the error correction data and the other stored data used for calculating the error correction data are available. The system can additionally use error correction algorithms that allow recovery of the stored information even if another data set used for the error correction data calculation is unavailable in addition to the data set that is being recovered.

The bottle-neck in applying the disclosed embodiments over a public network is the network data transfer speed as the recovery of the stored data requires all the data sets used for error correction data calculation other than the recovered data itself. In a situation where the stored data is behind slow network connections, the recovery time can be shortened by parallelizing the recovery process. The stored data can be split to parts and the error correction data is calculated for each of these parts with data available through different network connection. Then the data required for the recovery can be transferred in parallel the number of groups used for error correction calculation equaling the numbers of the parts.

The data can be recovered to a new mass memory storage in the premises of the service provider and thus avoid the transfer of the recovered data over the data network. The mass memory storage can be sent physically to the customer.

Encrypted data can be used for the error correction data calculation. If the aspects of the disclosed embodiments are applied as a service, encrypting the data ensures that the service provider has no access to the user's data. The error correction data is calculated in the same way as for the unencrypted data and the result of the recovery is the same encrypted data that was used for the error correction calculation.

If the stored data is changed, the error correction data can be updated by transferring the changed data and by calculating the new error correction data based on the old error correction data and the changed data. If the data that the redundancy is provided for is stored in a file system that supports taking snapshots of the data for a specific moment of time, the snapshot can be used to save the state of the storage when the data is transferred to the service for redundancy and later identify the changes in the stored data by comparing the difference between the snapshot of the last transfer and the current state. If the data is stored to a mass memory device that has components causing noise or components that consume a lot of energy, the data can be copied to silicon-based memory to wait for the transfer to the redundancy service, so that the mass memory component can be stopped for the duration of the transfer.

The members of the data groups used for the error correction data calculation can be selected based on various criteria, if the aspects of the disclosed embodiments are applied in a service over a public network. The users of the service and the associated risk can be classified based on the probability of user's data being unavailable or how old the mass storage device is. The risk analysis is trying to ensure that the composite risk levels of the error correction calculation group are low enough to prevent too many data sets being unavailable for the recovery calculation to be successful. The risk analysis can be done for new users of the users by initially creating full copies of user's stored data to the mass storage of the service provider and logging the availability of the user's stored data before the user's data is included in the error correction based redundancy scheme.

The geographical location of the stored data or the service user's data connection speed can be used as a factor in selecting the group of data sets for error correction calculation. The geographical distribution can be used to lower the risk of a natural disaster causing too many data sets becoming unavailable simultaneously. Network speed can be used to form the groups where only users with high speed connections belong to the same group allowing faster recovery times.

The size of the groups used for error correction data calculation can also be determined based on user risk analysis, mass storage device age, stored information geographical location, users' network connection speeds type of service or user's selected service level.

If the user's stored data is not available within specified time, the recovery can be started automatically to a new mass storage utilizing error correction data and the stored data that is available from the other users. The user can be removed from the group used for error correction data calculation, if the user's stored data is unavailable longer than a specified time. The time can be specified in the service contract. If the user's stored data is removed from the error correction calculation, the stored data can be removed from the data center to release the capacity for other use.

In creating the redundancy for the stored data the data identification information and the content of the data can be secured separately and the identification information can be copied directly even if the content is part of the error correction based redundancy scheme. This enables creation of recovery mechanism where data can prioritized for recovery based on the identification data. For example, user can select to recover office documents before music files.

If the aspects of the disclosed embodiments are implemented as a service, the error correction data can be stored in the mass storage of the service provider or alternatively certain portion of the mass storage devices of each of the users can be allocated for storing error correction data that is not based on the same user's stored data.

The integrity of the stored data can be verified by storing checksums of the data sets that are used for the calculation of the error correction data and the checksums are stored by the service. When receiving changed data from the user's mass storage, the service receives also the checksum for the data of the original data that the new data replaces. This ensures the integrity of the data. The checksums are calculated based on algorithms such as CRC (Cyclic Redundancy Check), MD5 (Message Digest) or SHA (Secure Hash Algorithm).

BRIEF DESCRIPTION OF THE DRAWINGS

In the following, a way of carrying out the method according to the disclosed embodiments is examined more closely using attached drawing, in which:

FIG. 1 illustrates a system utilizing the method according to the disclosed embodiments that is implemented as a service.

DETAILED DESCRIPTION OF THE DISCLOSED EMBODIMENTS

The example illustrated in FIG. 1 is non-exclusive. The system comprises of the service customers' mass storage devices 3, 5 that connect to the storage server 2 of the service provider using a public data network 1, for example, Internet. Customers store their information 3.1 to the mass storage using their terminals 4. The information is stored to the file system 3.2 in a mass storage device 3. The mass storage device 3 encrypts 3.3 the stored information 3.1 and sends the information in encrypted form using the public data networks 1 to the storage server 2. The storage server 2 calculates the error correction data 2.1 using the encrypted information sent by the users' mass storage devices 3, 5. The error correction data 2.3 is stored to the mass storage 2.2 of the storage server 2. When recovering the stored information 3.1 of the users of the service, the storage server 2 requests the stored information 3.1 of all the users that was part of the error correction data calculation 2.1 using the public data network 1 for use in the recovery calculation 2.4.

The error correction calculation 2.1 can use, for example, XOR-operation, where each bit of the data is calculated error correction data 2.3 together with specified number of other customer's data. In the case of XOR-operation the error correction data 2.3 indicates if the sum of the selected user data is odd or even. In a simple case when the error correction data 2.3 is calculated from two users' data, the value of the error correction is 0, if both users' data bits are equal and the value is 1, if the bits are not equal. If the data of one of the users is lost, it can be recovered by calculating the sum of the user data that is still available and the corresponding error correction data bit. When the sum is even, the recovered data bit is 0 and when the sum is odd, the recovered data bit is 1. The method can utilize such error correction algorithms that survive the unavailability of more than one user data sets. The size of the group used for the error correction calculation is selected based on the required probability for successful recovery. Each mass storage device can be approximated failure probability and using the probabilities each group of mass storage devices can be calculated a combined probability of simultaneously having more devices and the stored information unavailable than can be recovered using the error correction data 2.3.

The error correction data 2.3 can be calculated based on the blocks of the mass storage device 3, the blocks of the file system 3.2 or the blocks of the files of the file system 3.2. The stored information of a user of the service can be split to several groups used for the error correction data calculation 2.1. The recovery calculation 2.4 requires the data sets used for the error correction data calculation 2.1 excluding the data set being recovered. The data connections of the users of the service to the public data networks 1 may be slow and thus transferring the data required for the recovery calculation 2.1 from the customer to the storage server 2 can take a long time. The data transfer can be parallelized attaching the user to multiple groups, ensuring that number of groups where two individual users belong to the same group is minimized.

Some file systems include a feature, where the state of the file system 3.2 can be saved at a specified moment of time. This feature can be utilized in the system of the present invention by storing the state of the file system 3.2, when the changed information is sent to the storage server 2 for redundancy. Further changed information can be identified by comparing the saved state to the current state. The changed information can also be saved temporarily to silicon-based memory 3.4, so that a mass storage device, that is producing noise or consuming a lot of energy can be stopped for the duration of the transfer of the changed information to the storage server 2 using the public data network 1.

Risk analysis based on the mass storage device 3 age, the geographical location of the stored information 3.1 and the speed of the network connection of the user can be used to select the members of the groups used for error correction data 2.3 calculation. The probability of the availability of the user's stored information 3.1 can be approximated from the storage server 2 perspective, if new users of the service are attached to the service initially so that the stored information is copied to the storage server 2 and only when enough statistics about the availability of the stored data 3.1 availability is gathered, the user's mass storage device 3 is added to the error correction calculation 2.1.

If the user's mass storage device is unreachable for a specified amount of time, the service can start the recovery calculation 2.4 automatically for the user's stored information. The information is recovered to a new mass storage device. The user's stored information can also be removed from the error correction calculation, if it is found improbable that the user's mass storage device will become reachable again.

The meta-data of the user's stored information 3.1 can be stored as is to the storage server, so that the file system 3.2 structure and the file attributes are available without recovery calculation 2.4. This meta data can be, for example, utilized to offer the user a possibility to select the recovery order of the recovery calculation 2.4 as the recovery of the stored information 3.1 in large mass storage devices 3 over a public data network 1 may be slow and service users may have urgent need for small portion of all the stored data.

Alternatively the method of the disclosed embodiments can be implemented so that no error correction data 2.3 is stored in the storage servers 2 of the service provider, but so that specified portion of the service user's mass storage device 3 is reserved for error correction data storage. The user's own stored data is not to be included in the error correction data calculation, where the error correction data is stored to the user's device.

The aspects of the disclosed embodiments is not limited to the way of carrying out the invention or the technologies described above, but it can be modified within the attached claims.

The invention claimed is:

1. A method for data redundancy comprising:
transferring first user's data to be backed up to a remote service using a data network;
calculating error correction data using the first user's data to be backed up and data originated and stored by second users of the remote service; and
recovering the transferred data from the data stored by the second users of the remote service and the error correction data; wherein at least a portion of the first user's data to be backed up and the data originated and stored by second users of the remote service is not stored by the remote service.

2. The method of claim 1, further comprising storing the error correction data in a storage server of a service provider.

3. The method of claim 1, further comprising storing the error correction data in mass storage devices of third users other than the second users.

4. The method of claim 3, further comprising determining a size of a group of the second users storing data used for error correction data calculation based on a risk analysis of each second user, characteristics of each mass storage device used for storing the data, characteristics of a data network connection of each second user, a type of the stored data or a user selected service level.

5. The method of claim 1, further comprising encrypting the data to be backed up before transferring the data to the remote service, wherein the error correction data is calculated from the encrypted data and the transferred data is recovered to encrypted form.

6. The method of claim 1, further comprising splitting the data to be backed up into individual pieces, each individual piece having related error correction data calculated using the individual piece and data stored by the second users.

7. The method of claim 6, further comprising calculating the related error correction data using data stored by second users whose data is not used for calculating error correction data for any other piece.

8. The method of claim 1, further comprising calculating the error correction data again when the data to be backed up changes using a method where a new error correction data can be calculated based on the changed data and the error correction data.

9. The method of claim 8, further comprising storing the data to be backed up to a file system, wherein a state of the file system can be saved at any moment of time, the state can be recovered later and the difference between a saved state and a later state can be used to identify changes in the data stored to the file system.

10. The method of claim 1, further comprising selecting the data stored by the second users used for calculating the error correction data based on a risk analysis of each of the second users, characteristics of a mass storage device of each second user or characteristics of a network connection of each second user.

11. The method of claim 10, further comprising attaching each second user to the remote service and using usage information of each second user for creating the risk analysis.

12. The method of claim 1, further comprising automatically initiating data recovery of the transferred data if it is unavailable for a specified time period.

13. The method of claim 12, further comprising removing the data stored by one or more of the second users of the remote service used for calculating the error correction data if the data stored by the one or more second users is unavailable for specified time period.

14. The method of claim 1, further comprising copying stored metadata to the remote service separately and prioritizing a recovery order of the transferred data based on the metadata.

15. The method of claim 1, further comprising calculating a checksum from the transferred data used for the error correction data calculation wherein the checksum is used to verify that changed data sent to the remote service represents at least one change relative to the transferred data that was used to calculate the error correction data.

16. A storage server for providing a backup service using a data network to transfer first user's data to be backed up, the storage server comprising:
a non-transitory mass storage configured to store error correction data calculated using the first user's data to be backed up and information originated and stored by second users of the backup service, and configured to recover the transferred data from the information stored by the second users and the error correction data; wherein at least a portion of the first user's data to be backed up and the data originated and stored by second users of the backup service is not stored by the storage server.

17. The storage server of claim 16, wherein the non-transitory mass storage is further configured to store the error correction data.

18. The storage server of claim 16, further configured to split the data to be backed up into pieces, each piece having related error correction data calculated with the stored data of the second users of the service.

19. The storage server of claim 18, further configured to calculate the related error correction data using data stored by second users whose data is not used for calculating error correction data for any other piece.

* * * * *